(12) United States Patent
Butler et al.

(10) Patent No.: US 11,769,992 B2
(45) Date of Patent: Sep. 26, 2023

(54) HYDRAULIC DISPLACEMENT MECHANISM AND METHOD OF USE

(71) Applicant: ButlerBilt L.L.C., Flat Rock, MI (US)

(72) Inventors: Michael Butler, Flat Rock, MI (US); John Lambert, Newport, MI (US)

(73) Assignee: ButlerBilt L.L.C., Carleton, MI (US)

( * ) Notice: Subject to any disclaimer, the term of this patent is extended or adjusted under 35 U.S.C. 154(b) by 56 days.

(21) Appl. No.: 17/148,889

(22) Filed: Jan. 14, 2021

(65) Prior Publication Data
US 2021/0226427 A1    Jul. 22, 2021

Related U.S. Application Data

(60) Provisional application No. 62/962,352, filed on Jan. 17, 2020.

(51) Int. Cl.
*H02G 1/08* (2006.01)
*F15B 15/14* (2006.01)

(52) U.S. Cl.
CPC ......... *H02G 1/081* (2013.01); *F15B 15/1404* (2013.01)

(58) Field of Classification Search
CPC ............ H02G 1/00; H02G 1/081; H02G 1/06
See application file for complete search history.

(56) References Cited

U.S. PATENT DOCUMENTS

| | | | |
|---|---|---|---|
| 7,396,060 B2 * | 7/2008 | Huncovsky | F16L 1/06 294/96 |
| 7,654,774 B1 * | 2/2010 | Jarred | F16L 1/032 405/184 |
| 8,322,689 B2 * | 12/2012 | Johnson | H02G 1/02 254/134.3 R |
| 2012/0061633 A1 * | 3/2012 | Holley | H02G 1/085 254/134.3 R |
| 2021/0226427 A1 * | 7/2021 | Butler | F15B 15/1404 |

* cited by examiner

*Primary Examiner* — Lee D Wilson
(74) *Attorney, Agent, or Firm* — MacMillan, Sobanski & Todd, LLC

(57) ABSTRACT

Hydraulic displacement mechanisms, and methods of using hydraulic displacement mechanisms to remove cables jammed or stuck in a conduit or other passageways, are disclosed.

20 Claims, 9 Drawing Sheets

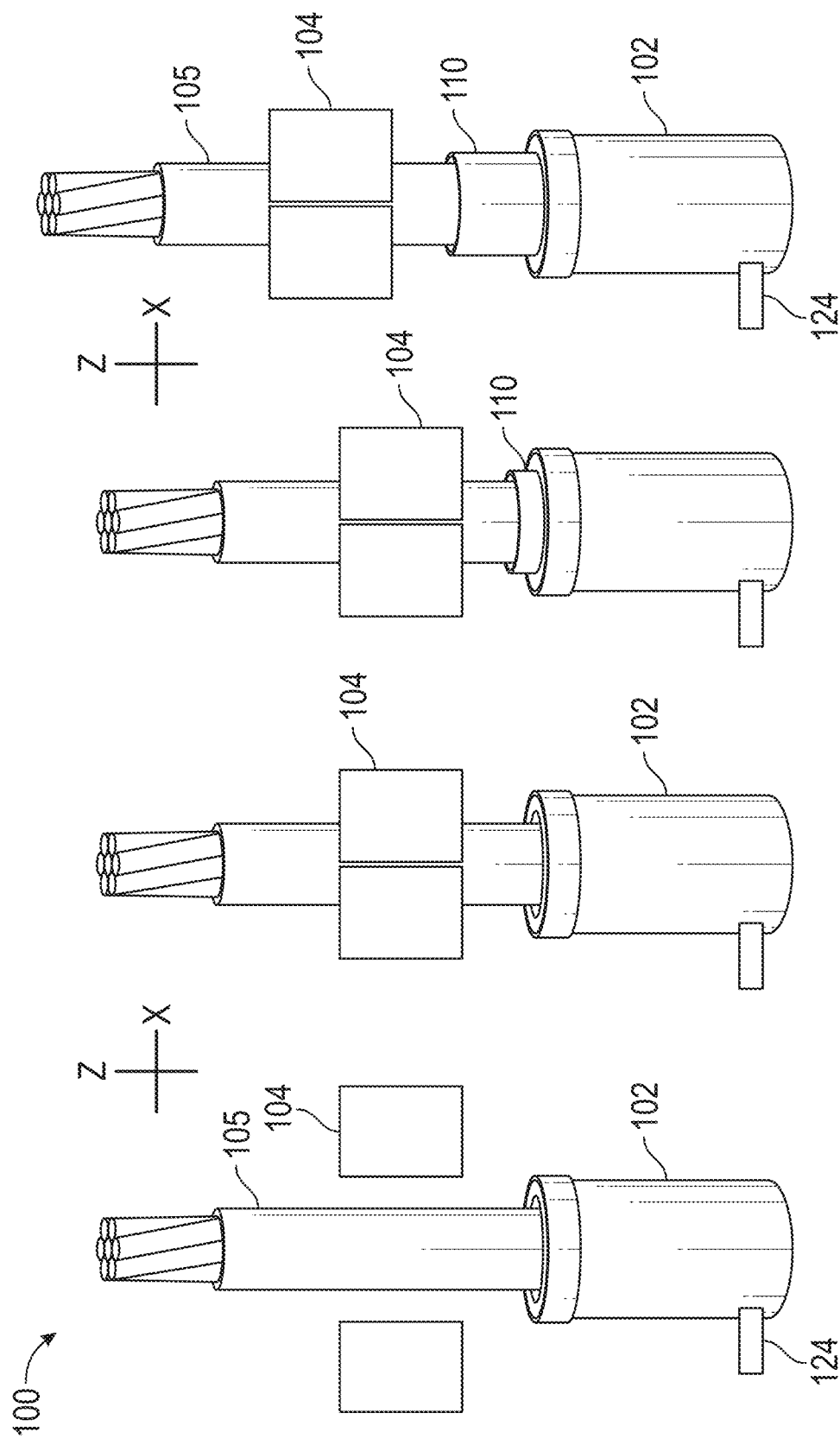

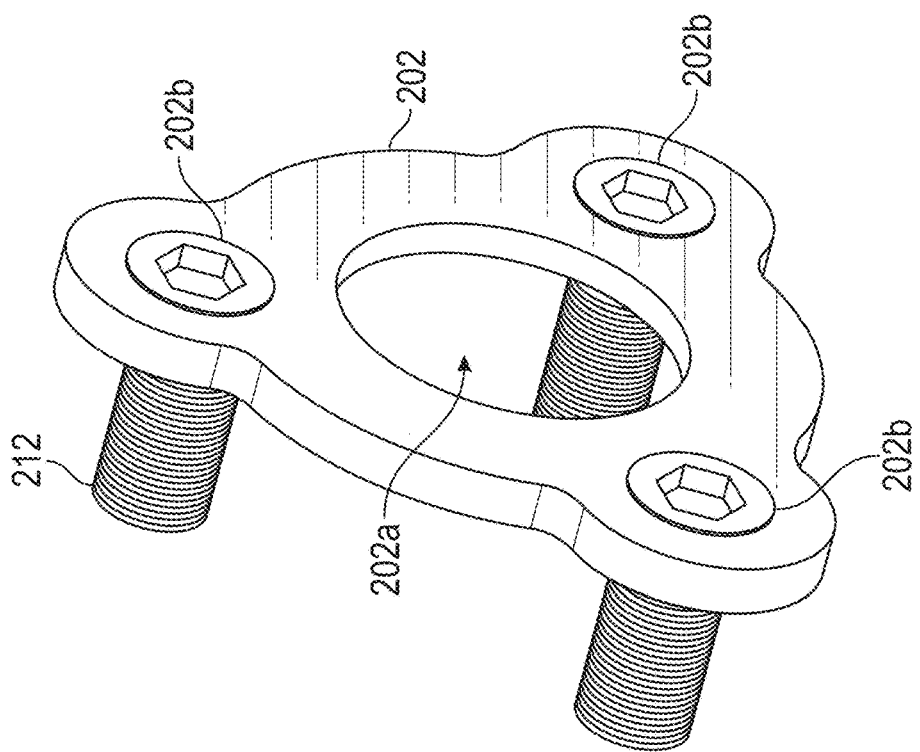
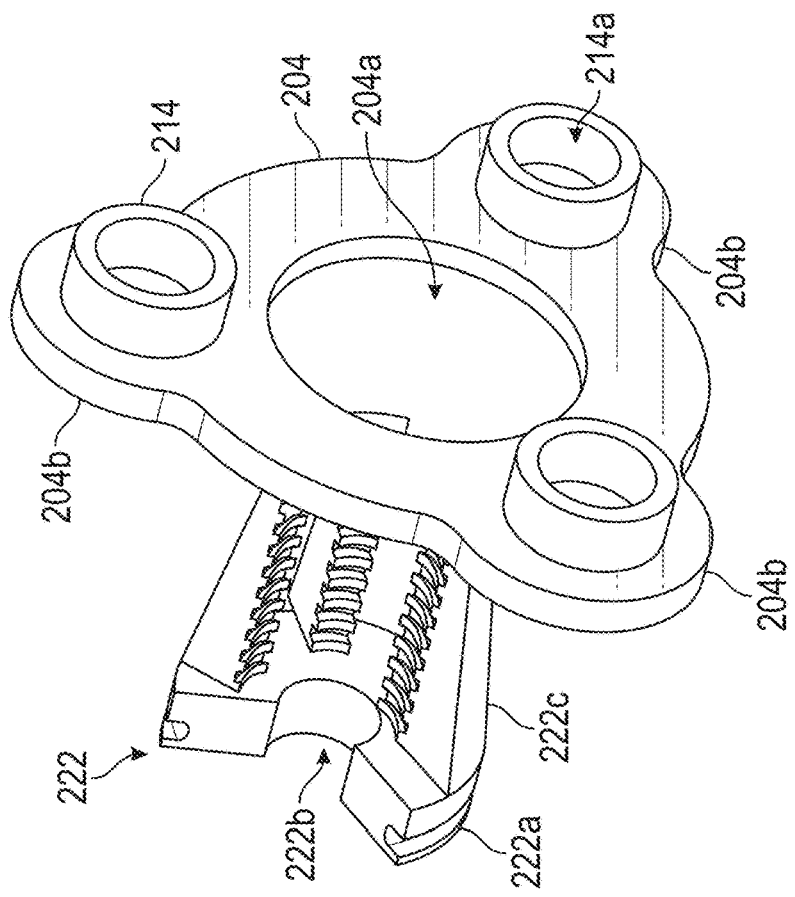
FIG. 10

HYDRAULIC DISPLACEMENT MECHANISM AND METHOD OF USE

RELATED APPLICATIONS

This application claims priority to U.S. Provisional Application No. 62/962,352 filed under 35 U.S.C. § 111(b) on Jan. 17, 2020, the disclosure of which is incorporated herein by reference in its entirety.

BACKGROUND

People rely on cables to transport electricity and data. Over time, cables may become damaged and/or technologically outdated and require removal. Additionally, cables may require removal based on evolving societal needs for land uses and development.

Removing cables can be time consuming and frustrating because the cables may become lodged or embedded in a structure during removal. Current processes to dislodge the cables may employ a pulley system that is limited by the manner in which pressure is applied to the embedded cable to free the cable and by the amount of pressure which can be applied to the embedded cable to free the cable. For example, the current pulley system used to dislodge cables is limited to applying indirect pressure to the cable. It would be beneficial to have an improved system and method for dislodging cables stuck in their surroundings that is capable of applying greater force to the cable to free the cable and that is capable of applying direct pressure to the cable to free the cable.

SUMMARY

Provided herein is a method of utilizing a hydraulic displacement mechanism to dislodge stuck cables or similar objects. The method includes inserting the stuck cable through the hydraulic displacement mechanism; attaching a clamping mechanism to the stuck cable, wherein the clamping mechanism is located proximate to the hydraulic displacement mechanism; and actuating the hydraulic displacement mechanism by injecting hydraulic fluid into the hydraulic displacement mechanism such that the hydraulic displacement mechanism engages the clamping mechanism to free the stuck cable.

In certain embodiments, the hydraulic displacement mechanism is configured to dislodge the cable by directly applying force to the cable. In certain embodiments, the hydraulic displacement mechanism dislodges the cable by directly applying force to the cable.

In certain embodiments, the clamping mechanism is configured to detach after the cable is dislodged. In certain embodiments, the clamping mechanism is detached after the cable is dislodged.

Provided herein is a hydraulic displacement mechanism configured to release a stuck or jammed cable from a conduit or passageway. The hydraulic displacement mechanism has a cap including an opening and a plurality of cap holes; a base including a base opening and a plurality of base holes; a plurality of hydraulic cylinders having a first end, a second end, and a fluid port, wherein each of the plurality of hydraulic cylinders extends between the base and the cap with a first end of the hydraulic cylinder attached to the base and the second end of the hydraulic cylinder attached to the cap; a housing connected to the cap, wherein the housing has a housing first end, a housing second end, and a recess in the housing second end; and a clamping mechanism.

In certain embodiments, the recess has a size and shape configured to receive a clamping mechanism.

In certain embodiments, the recess has walls that extend radially inward from the second end of the housing to the first end of the housing.

In certain embodiments, the clamping mechanism is a collet.

In certain embodiments, the cap opening is centrally located in the cap and has a circular shape. In certain embodiments, the base opening is centrally located in the base and has a circular shape. In certain embodiments, the plurality of cap holes are positioned circumferentially about the cap opening with each hole spaced equidistant from each other and equidistant from the cap opening. In certain embodiments, the plurality of base holes are positioned circumferentially about the base opening with each hole spaced equidistant from each other and equidistant from the base opening. In certain embodiments, the base opening is aligned with the cap opening.

In certain embodiments, a fastener attaches one end of each hydraulic cylinder to the base at each of the plurality of base holes. In certain embodiments, a fastener attaches one end of each hydraulic cylinder to the cap at each of the plurality of cap holes.

In certain embodiments, the plurality of hydraulic cylinders includes three hydraulic cylinders. In particular embodiments, the three hydraulic cylinders extend in a parallel manner between the base and the cap.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 1A shows an illustration of the first embodiment of the hydraulic displacement mechanism in a retracted position. FIG. 1B shows an illustration of the first embodiment of the hydraulic displacement mechanism in a partially-extended position.

FIG. 2A shows a cross sectional view of the hollow hydraulic cylinder in the retracted position. FIG. 2B shows a cross sectional view of the hollow hydraulic cylinder in the partially-extended position.

FIGS. 3A-3D: Schematically illustrations of a process for releasing a cable jammed in a conduit utilizing the first embodiment of the hydraulic displacement mechanism illustrated in FIGS. 1A-1B.

FIG. 6A shows the second embodiment of the hydraulic displacement mechanism in a retracted position. FIG. 6B shows the second embodiment of the hydraulic displacement mechanism in an extended position.

FIG. 10: Illustration of the base and cap from the second embodiment of the hydraulic displacement mechanism.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Figure 1A:
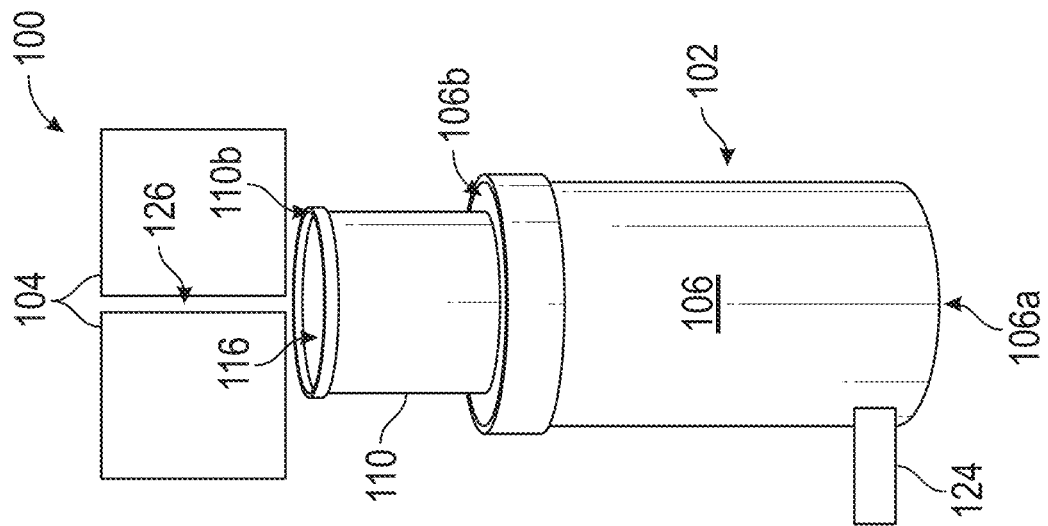
FIGS. 1A-1B: Illustrations of a first embodiment of a hydraulic displacement mechanism comprising a hollow hydraulic cylinder and a clamping mechanism according to this disclosure.
Figure 1B:
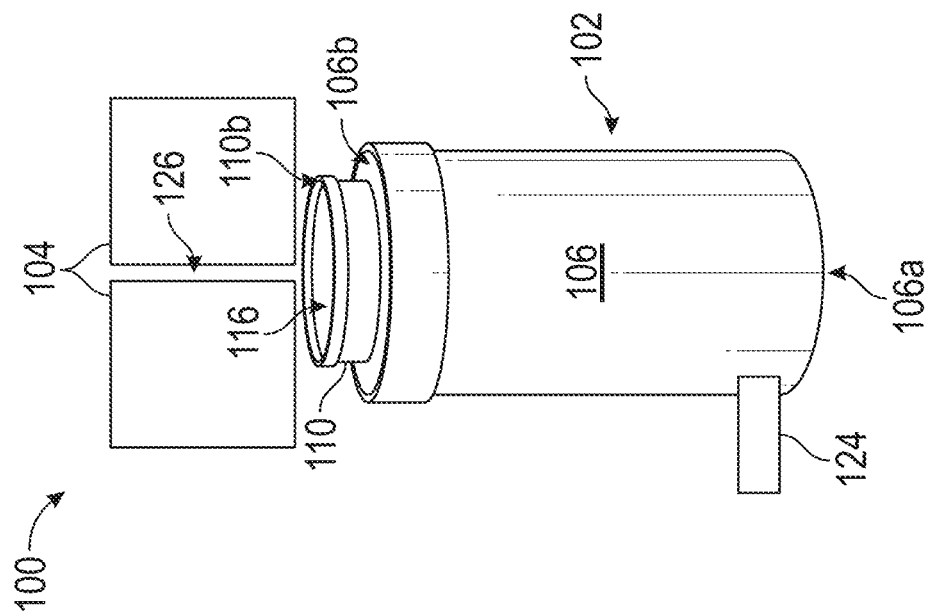

Referring now to FIGS. 1-3, there is illustrated a first embodiment of a hydraulic displacement mechanism 100 according to the present disclosure. The first embodiment of the hydraulic displacement mechanism 100 comprises a hydraulic cylinder 102 and a clamping mechanism 104.

Referring still to FIGS. 1-3, it can be seen that the hydraulic cylinder 102 generally comprises a tubular body 106 defining a longitudinally disposed cylindrical chamber 108 bounded in the z-direction by a rear end 106a and a front end 106b of the tubular body 106 and bounded in the x-direction by an inner wall 106c and an outer wall 106d of the tubular body 106. The cylindrical chamber 108 is configured to receive a reciprocatable hollow cylinder rod 110, as will be described below.

Figure 2A:
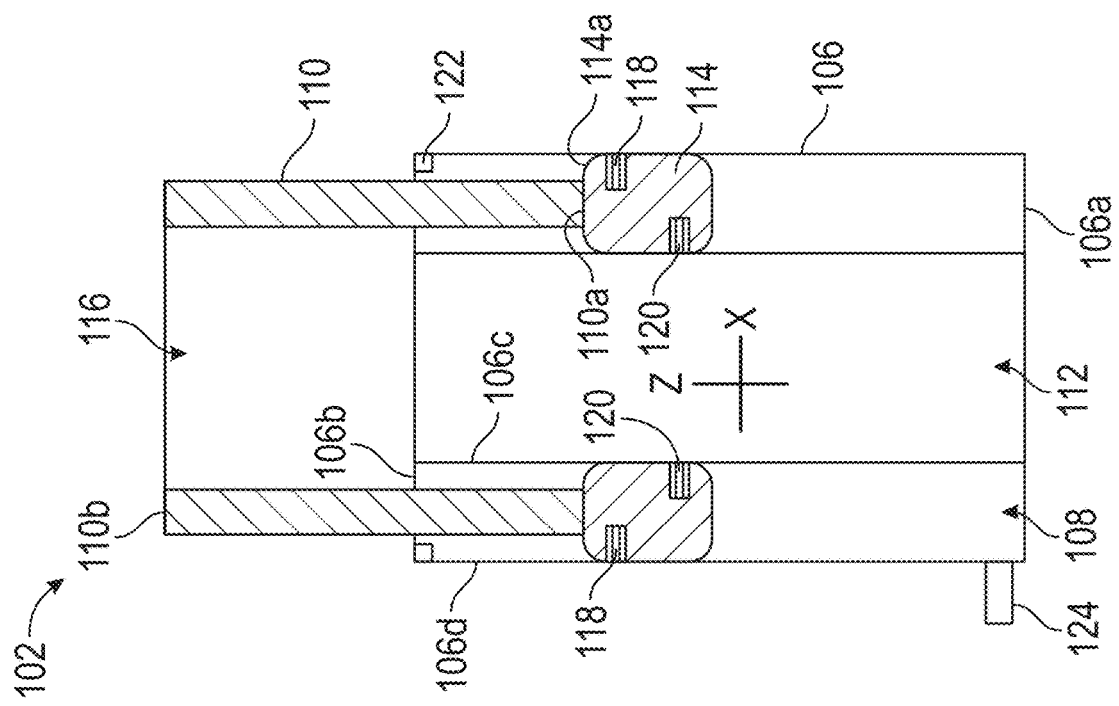
FIGS. 2A-2B: Cross sectional views of the hollow hydraulic cylinder from FIGS. 1A-1B in a retracted position and in a partially-extended position.
Figure 2B:
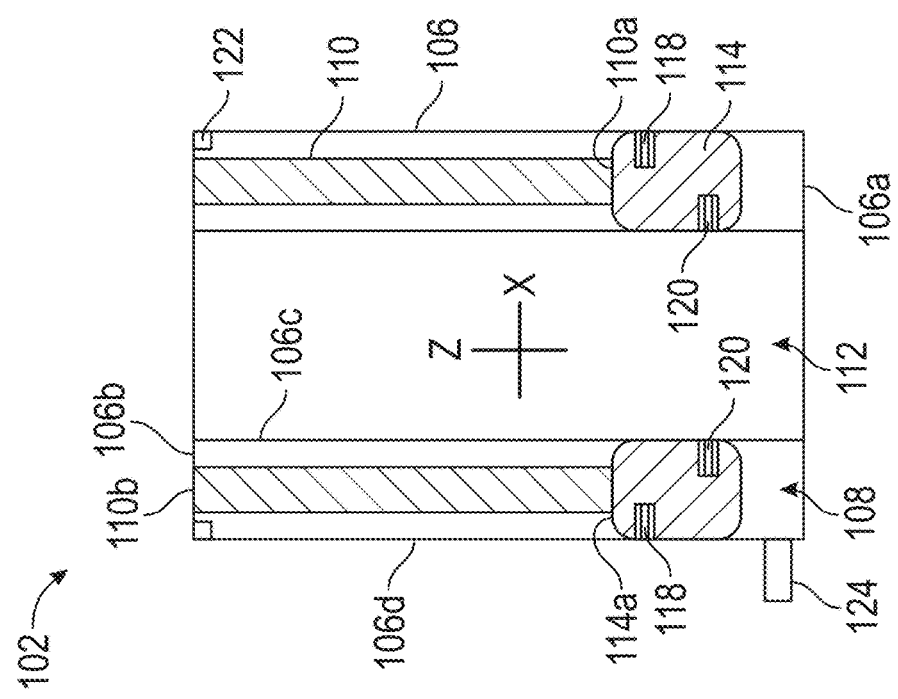

Referring now to FIGS. 2A-2B, the annular inner wall 106c of the tubular body 106 defines a longitudinally disposed cylindrical passage 112 that extends the length of the tubular body 106 in the z-direction between the rear end 106a and the front end 106b. The cylindrical passage 112 extends parallel to the longitudinally disposed cylindrical chamber 108.

Referring still to FIGS. 2A-2B, the reciprocatable hollow cylinder rod 110 has a first end 110a and a second end 110b with a piston 114 mounted at the first end 110a. The combination of the hollow cylinder rod 110 and the piston 114 may be referred to as a piston assembly. The hollow cylinder rod 110 has a longitudinally disposed cylindrical channel 116 extending the length of the cylinder rod 110 between the first end 110a and the second end 110b. The hollow cylinder rod 110 has a diameter and thickness that permits the hollow cylinder rod 110 to be positioned within the cylindrical chamber 108 for reciprocating action therethrough. The piston 114 has a diameter and thickness that permits the piston 114 to be slidingly and sealingly seated within the cylindrical chamber 108 for reciprocating action therethrough.

The piston 114 may have a radially outer surface, preferably with an outer sealing ring 118 seated therein, or other such suitable sealing system. The piston 114 may also have an inner sealing ring 120. The piston 114 has a diameter corresponding to the diameter of the cylindrical chamber 108 and is adapted to be slidingly and sealingly mounted therein for reciprocating action therethrough. The piston 114 may have a stop engagement surface 114a that engages a stop 122 projecting radially inward from the outer wall 106d of the tubular body 106 to prevent further movement of the piston assembly in the cylindrical chamber 108 of the tubular body 106.

Referring to FIGS. 1-3, the tubular body 106 may have a fluid port 124 configured to receive hydraulic fluid. Before sufficient introduction of hydraulic fluid into the cylindrical chamber 108, the hydraulic cylinder 102 is in the retracted position, as best shown in FIG. 2A. In the retracted position depicted in FIG. 2A, the cylinder rod 110 is housed within the tubular body 106 with the second end 110b of the cylinder rod 110 level with the front end 106b of the tubular body 106.

To actuate the hydraulic cylinder 102, hydraulic fluid may be injected through the fluid port 124 into the cylindrical chamber 108 of the tubular body 106. Continued introduction of hydraulic fluid into the cylindrical chamber 108 causes pressure to build in the cylindrical chamber 108 because of cooperation between the outer and inner sealing rings 118, 120 of the piston 114 with the respective inner and outer walls 106c, 106d of the tubular body 106. The mounting pressure applies force to the piston 114 which causes the piston 114 to slidably move in a linear direction along the z-axis towards the front end 106b of the tubular body 106. Movement of the piston assembly causes the cylinder rod 110 to move along the z-axis such that the cylinder rod 110 extends from the front end 106b of tubular body 106, as best shown in FIG. 2B. Further movement of the piston assembly, and by extension, the cylinder rod 110, is prevented when the stop engagement surface 114a of the piston 114 engages a stop 122 which projects into the cylindrical chamber 108. The tubular body 106 of the hydraulic cylinder 102 may include a second port to vent hydraulic fluid in the cylindrical chamber 108. The cylinder rod 110 can be retracted manually or mechanically.

A first embodiment of the hydraulic displacement mechanism 100 further includes a clamping mechanism 104. In the embodiment shown in FIGS. 1A-1B and 3A-3D, the clamping mechanism 104 is a removable component that is attached to a cable proximate to the front end 106b of the tubular body 106. The clamping mechanism 104 may have a clamping mechanism channel 126 extending therethrough and be configured to accept a cable 105.

Referring now to FIGS. 3A-3D, there is illustrated a process for freeing embedded cables using the first embodiment of the hydraulic displacement mechanism 100 shown in FIGS. 1-2 and described above. As shown in FIG. 3A, the cable 105 is inserted through the cylindrical passage 112 in the hydraulic cylinder 102 with the hydraulic cylinder 102 in the retracted position. Then, a clamping mechanism 104 is attached to the cable 105 at a position proximate to the front end 106b of the tubular body and second end 110b of the cylinder rod 110, as shown in FIG. 3B. Next, hydraulic fluid is injected through the fluid port 124 into the cylindrical chamber 108 of the tubular body 106, which forces the piston 114 to slidably move in a linear direction along the z-axis towards the front end 106b of the tubular body 106. Movement of the piston 114 causes the cylinder rod 110 to move in the z-direction such that the cylinder rod 110 extends from the front end 106b of tubular body 106 and engages the clamping mechanism 104, as shown in FIG. 3C. Further movement of the cylinder rod 110 causes the clamping mechanism 104 to firmly retain the cable 105 while also moving the cable 105 secured by the clamping mechanism 104 linearly along the z-axis in the z-direction. In this manner, the hydraulic displacement mechanism 100 dislodges the cable 105 in the direction of force, in this example the z-direction, by directly applying pressure to the cable 105 along the z-axis.

Referring now to FIGS. 4-10, there is illustrated a second embodiment of a hydraulic displacement mechanism 200 according to the present disclosure. The second embodiment of the hydraulic displacement mechanism 200 shown in FIGS. 4-10 has an improved design which makes it particularly useful to dislodge cables jammed or lodged in a surrounding environment.

Figure 5:
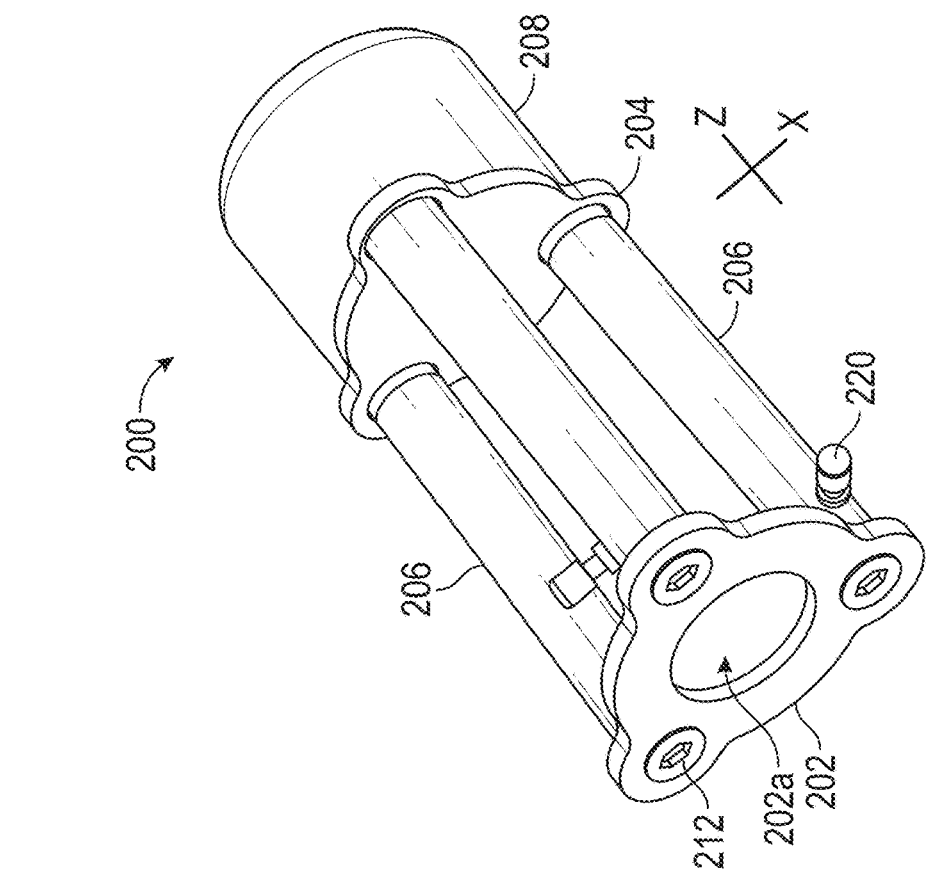
FIG. 5: Perspective view of the second embodiment of the hydraulic displacement mechanism illustrated in FIG. 4.
Figure 4:
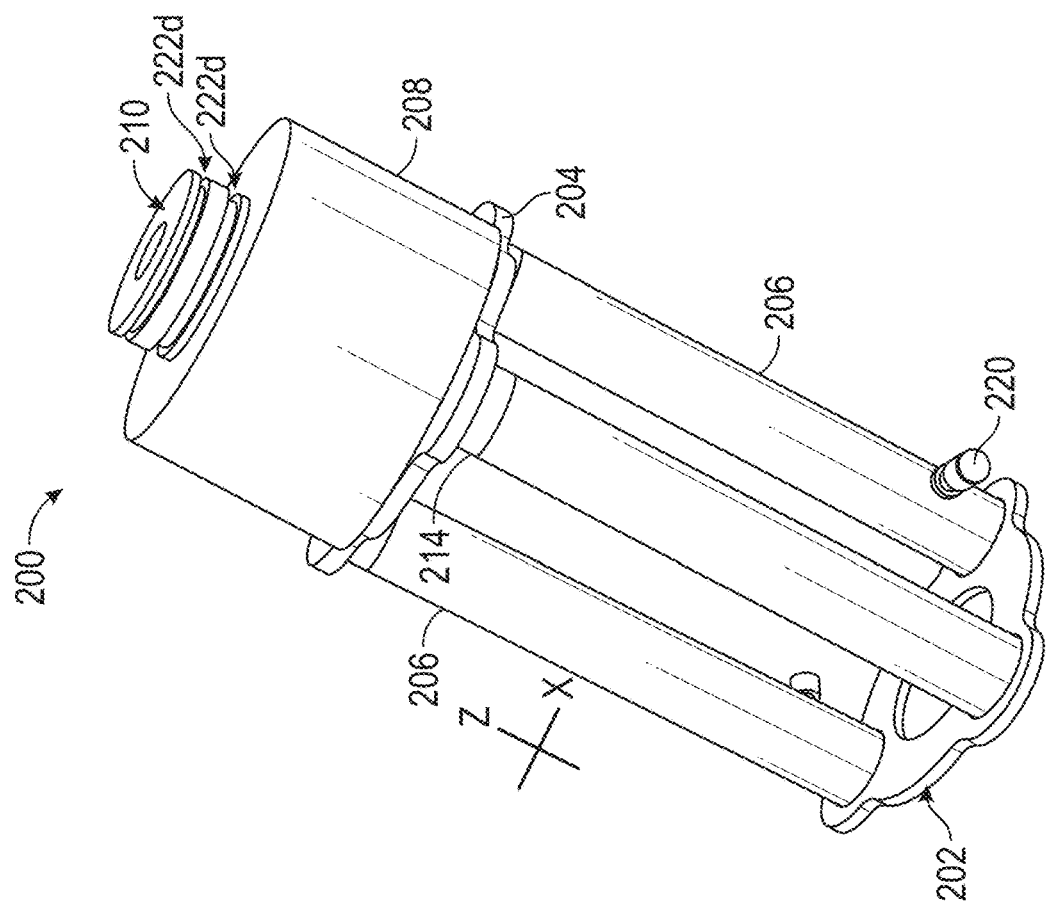
FIG. 4: Perspective view of a second embodiment of a hydraulic displacement mechanism according to this disclosure.

Referring now to FIGS. 4-6, the hydraulic displacement mechanism 200 includes a base 202, a cap 204, and a plurality of hydraulic cylinders 206 extending between, and connected to, the base 202 and the cap 204. The base 202 is configured to attach to one end 206a of each hydraulic cylinder 206 and the cap 204 is designed to attach to the opposing end 206b of each hydraulic cylinder 206 in a manner that will be described in more detail below. The hydraulic displacement mechanism 200 further includes a housing 208 connected to the cap 204 which has a size and shape configured to receive and cooperate with a clamping mechanism 210 to secure a cable in a manner that will be described below.

Referring now to FIG. 10, the base 202 may include an opening 202a and a plurality of holes 202b which each extend through the base 202. In the embodiment illustrated in FIGS. 3-5 and 7-9, the opening 202a is circular. However, the opening 202a is not limited to any particular shape. The opening 202a may be located approximately in the center of the base 202 for reasons that will become clear. Each of the plurality of holes 202b may be positioned circumferentially about the opening 202a in the base 202 with each hole 202b spaced equidistant from each other and equidistant from the opening 202a. As shown in FIG. 10, each hole 202b is configured to receive a fastener, such as a threaded bolt 212, with the fastener being used to secured one end 206a of a hydraulic cylinder 206 to the base 202.

In the embodiment depicted in FIGS. 4-6 and 8-10, the base 202 contains three holes 202b and three threaded bolts 212 are employed to affix three hydraulic cylinders 206 to the base 202. Although this disclosure is not limited to any particular number of holes 202b, the number of holes 202b included in the base 202 should correspond to the number of hydraulic cylinders 206 to be affixed to the base 202 for use in the hydraulic displacement mechanism 200.

The cap 204 includes a cap opening 204a and a plurality of holes 204b which extend through the cap 204. In the embodiment illustrated in FIGS. 4-6 and 8-10, the cap opening 204a is circular, however, the cap opening 204a is not limited to any particular shape. The cap opening 204a may be located approximately in the center of the cap 204 to ensure cooperation with the base 202, as will be explained below. Each of the plurality of holes 204b may be positioned circumferentially about the cap opening 204a with each hole 204b spaced equidistant from each other and equidistant from the cap opening 204a. As shown in FIG. 10, each hole 204b is configured to receive a fastener, such as a bolt 214, containing a receiving slot 214a, with one end 206b of each hydraulic cylinder 206 configured to be attached to the cap 204 by inserting the end 206b of the hydraulic cylinder 206 into the receiving slot 214a of the bolt 214 at each hole 204b in the cap 204.

In the embodiment depicted in FIGS. 3-5 and 7-9, the cap 204 contains three holes 204b and three fasteners 214 are employed to affix three hydraulic cylinders 206 to the cap 204. Although this disclosure is not limited to any particular number of holes 204b, the number of holes 204b included in the cap 204 should correspond to the number of hydraulic cylinders 206 affixed to the cap 204 for use in the hydraulic displacement mechanism 200. Moreover, because the base 202 and the cap 204 cooperate with each other to secure opposing ends 206a, 206b of each respective hydraulic cylinder 206, the number of holes 202b in the base 202 should correspond to the number of holes 204b in the cap 204.

Referring now to FIGS. 6A-6B and 8-9, the second embodiment of the hydraulic displacement mechanism 200 includes a plurality of hydraulic cylinders 206 connected between the base 202 and the cap 204. Because the base 202 and the cap 204 cooperate to secure the plurality of hydraulic cylinders 206 between the base 202 and the cap 204, the specific orientation of the cap opening 204a and the plurality of holes 204b in the cap 204 should coincide with the specific orientation of the opening 202a and the plurality of holes 202b in the base 202. This coordination of structural features in the base 202 and the cap 204 ensures each hydraulic cylinder 206 connected between the base 202 and the cap 204 is arranged circumferentially about the openings 202a, 204a and extends collinearly, along the z-axis, with every other hydraulic cylinder 206 connected between the base 202 and the cap 204.

Each hydraulic cylinder 206 operates in a manner similar to the hydraulic cylinder 102 shown in FIGS. 1-3 and described above. Each hydraulic cylinder 206 has a tubular body 216 defining a longitudinally disposed cylindrical chamber bounded in the z-direction by a rear end 216a and a front end 216b of the tubular body 216 and bounded in the x-direction by an inner wall and an outer wall 216d of the tubular body 216. The tubular body 216 is configured to receive a reciprocatable cylinder rod 218 which cooperates with a piston during actuation of the hydraulic displacement mechanism 200 in a manner described below.

Figure 6B:
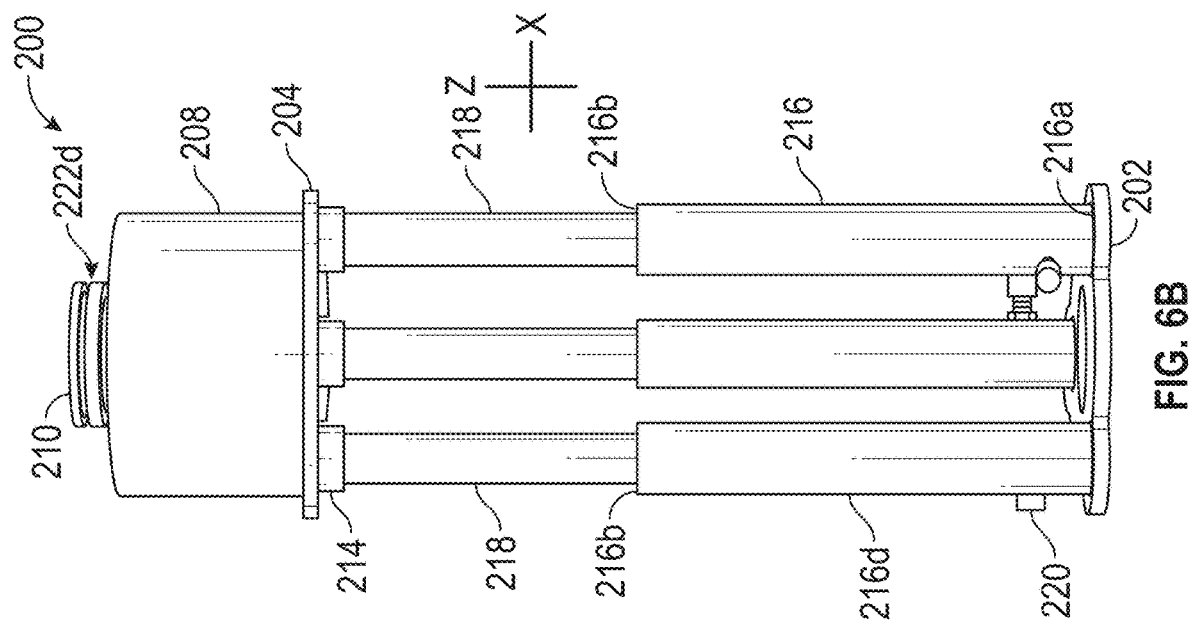
FIGS. 6A-6B: Illustrations of the second embodiment of the hydraulic displacement mechanism depicted in FIGS. 4-5 in a retracted position and in an extended position.
Figure 6A:
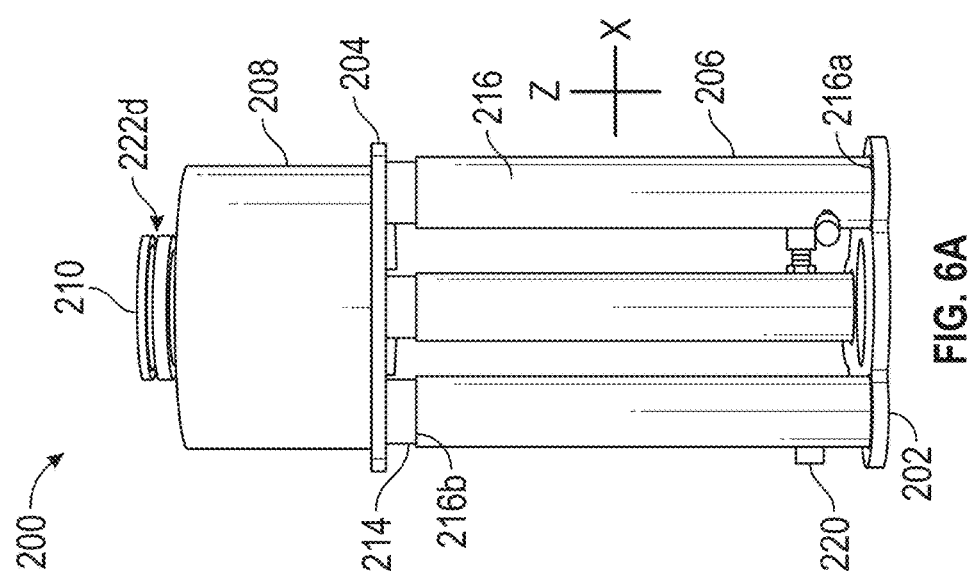

Each tubular body 216 includes a fluid port 220 configured to receive hydraulic fluid. Before sufficient introduction of hydraulic fluid into the cylindrical chamber, the hydraulic cylinder 206 is in the retracted position, as shown in FIG. 6A. In the retracted position depicted in FIG. 6A, the cylinder rod 218 is housed within the tubular body 216.

To actuate the plurality of hydraulic cylinders 206, hydraulic fluid may be injected through the fluid port 220 into the cylindrical chamber of the tubular body 216. It is beneficial to operate each hydraulic cylinder 206 synchronously to ensure stability and equal distribution of force applied across the hydraulic displacement mechanism 200 and applied by the hydraulic displacement mechanism 200. Continued introduction of hydraulic fluid into each cylindrical chamber causes pressure to build in each cylindrical chamber. The mounting pressure applies force to the piston assembly which causes the piston to slidably move in a linear direction along the z-axis towards the front end of each tubular body 206. Movement of the piston assembly causes the cylinder rod 218 to move in the z-direction such that the cylinder rod 218 extends from the front end 216b of tubular body 216, as shown in FIG. 6B. The tubular body 216 of the hydraulic cylinder 206 may include a second port to vent hydraulic fluid in the cylindrical chamber. The cylinder rod 218 can be retracted manually or mechanically. The cap 204 and the base 202 may be made of aluminum or steel depending on the amount of the pulling pressure.

Figure 7:
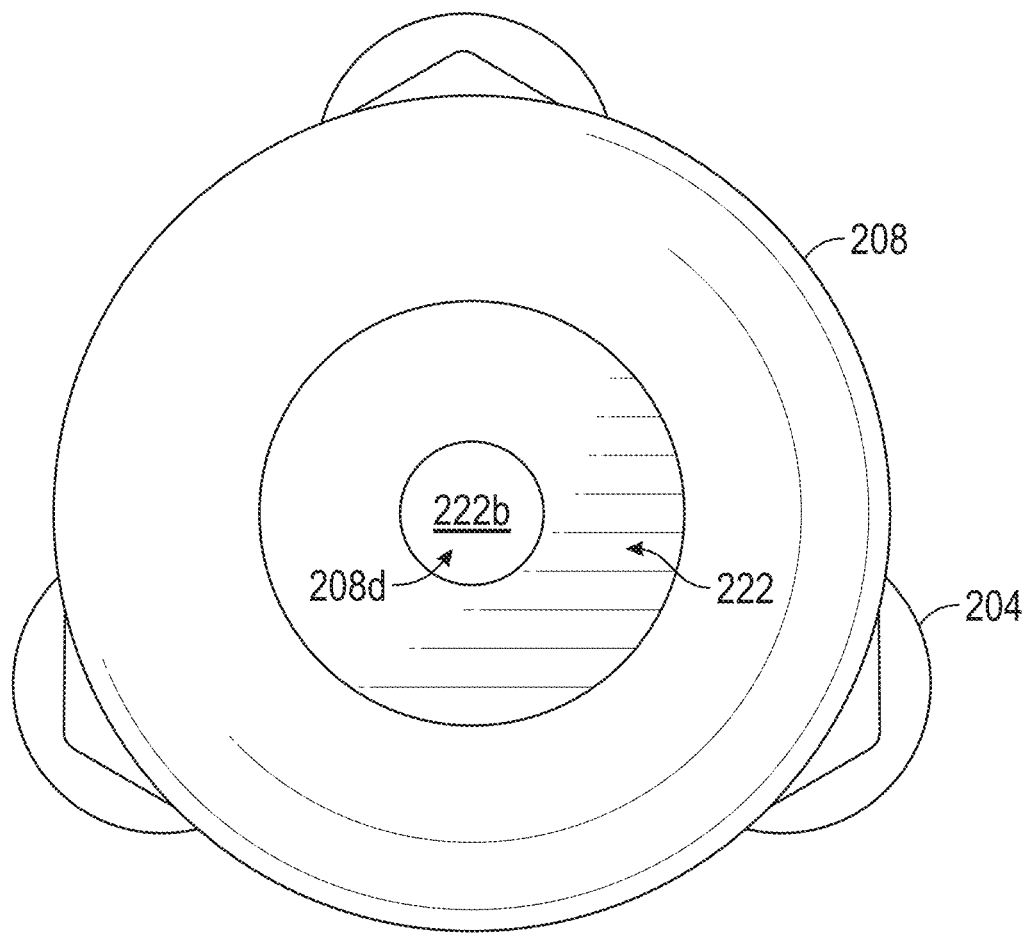
FIG. 7: Top view of the second embodiment of the hydraulic displacement mechanism.

As best illustrated in FIG. 7, the hydraulic displacement mechanism 200 includes a housing 208 connected to the cap 204. The housing 208 generally has a cylindrical body with first end 208a and a second end 208b. The first end 208a of the housing 208 is connected to the cap 204 and the second end 208b of the housing 208 includes a recess 208c. A channel 208d extends between the first end 208a and the second end 208b and passes through the recess 208c, as shown in FIG. 7. The channel 208d has a size and shape suitable to receive a cable. When the housing 208 is connected to the cap 204, the channel 208d, cap opening 204a, and base opening 202a are all aligned with each other.

Figure 8:
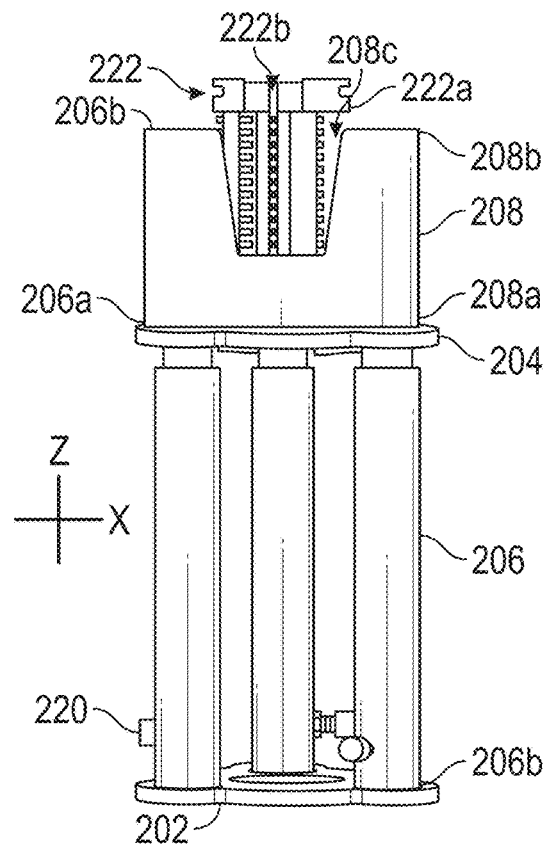
FIG. 8: Illustration of the second embodiment of the hydraulic displacement mechanism with a portion of the housing cut-out.
Figure 9:
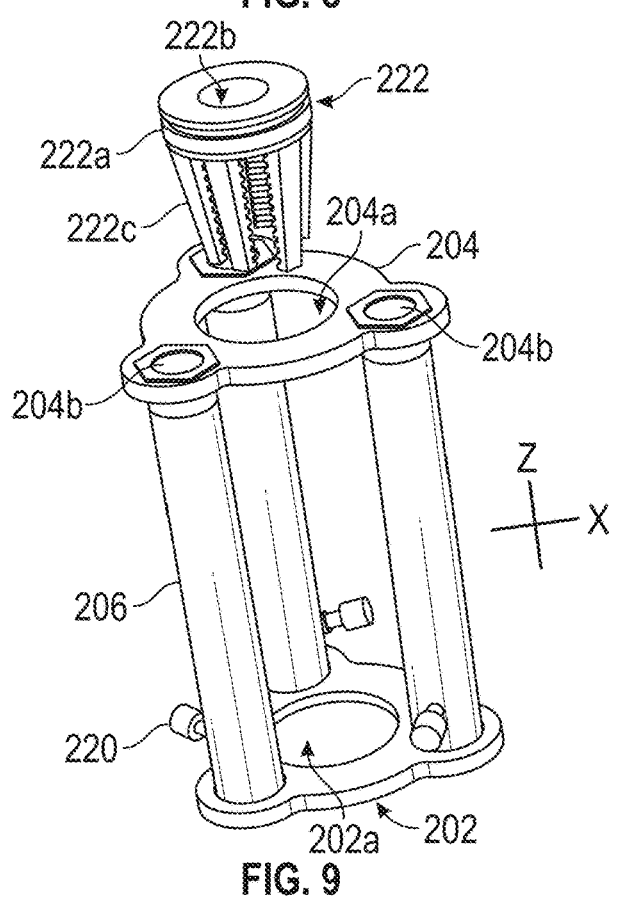
FIG. 9: Illustration of the second embodiment of the hydraulic displacement mechanism with the housing removed.

Referring to FIGS. 8-10, the hydraulic displacement mechanism 200 may further include a clamping mechanism 210, such as a collet 222. The housing recess 208c has a size and shape configured to receive the clamping mechanism 210. The size and shape of the recess 208c is important because the walls that define the recess 208c engage the surface of the clamping mechanism 210, causing the clamping mechanism 210 to tighten around a cable. In the embodiment shown in FIG. 8, the walls of the recess 208c extend radially inward along the z-axis from the second end 208b of the housing 208 to the first end 208a of the housing 208.

In the embodiment shown in FIGS. 4-9, the clamping mechanism 210 is a collet 222. The collet 222 has an upper cylindrical body 222a with a bore 222b extending therethrough. The collet 222 has arms 222c extending from the upper body 222a which can be manipulated to secure an object within the collet 222 as the arms 222c of the collet 222 are forced radially inwards along the z-axis. The collet 222 has at least one seal 222d, which may be an annular ring around the upper body 222a of the collet 222. The at least one seal 222d is designed to engage the walls of the housing recess 208c when the collet 222 is nested in the housing 208.

Figure 11:
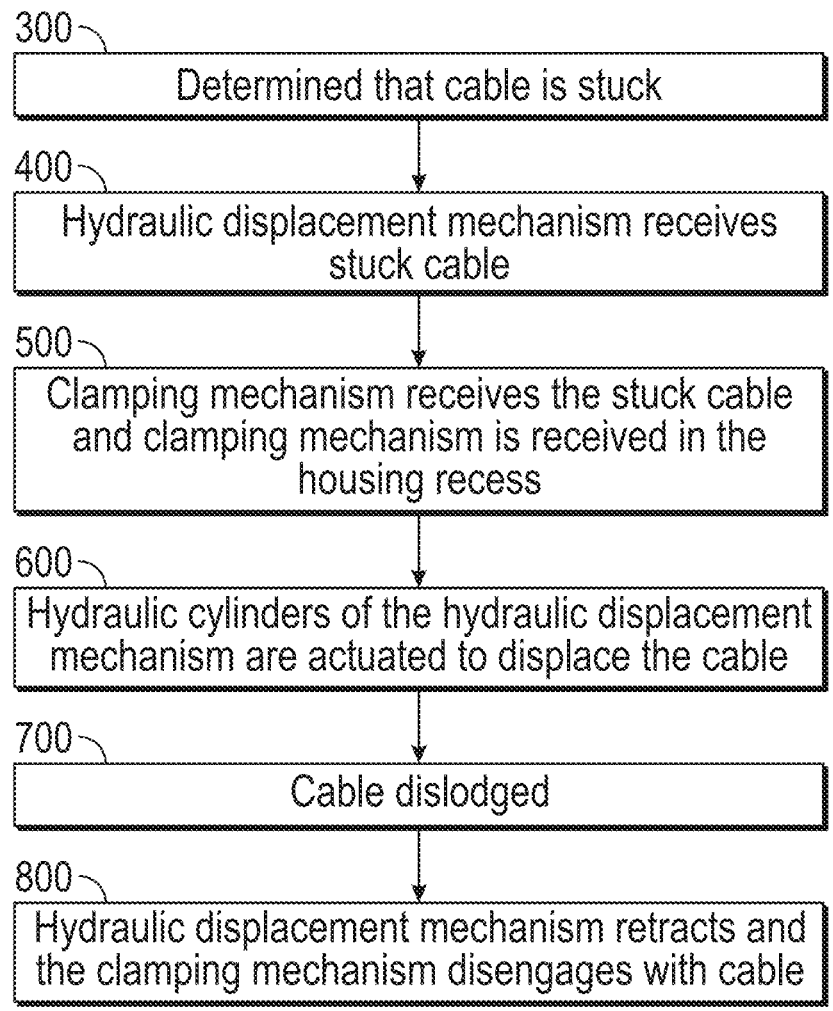
FIG. 11: Operational diagram of the steps of a non-limiting example method of utilizing the second embodiment of the hydraulic displacement mechanism to release a cable jammed in a conduit.

Referring now to FIG. 11, there is illustrated a non-limiting example process for freeing embedded cables using a hydraulic displacement mechanism, such as the second embodiment of the hydraulic displacement mechanism 200, shown in FIGS. 4-10 and described above. Once a cable is determined to be jammed, at step 300, the cable is extended through the base opening 202a, cap opening 204a, and housing channel 208d, at step 400. At this stage in the process, the hydraulic displacement mechanism 200 is in the retracted position. Then, at step 500, the clamping mechanism 210, such as a collet 222, receives the cable in the bore 222b of the collet 222. The collet 222, with the cable extending therethrough, is positioned within the housing 208 at step 500. When the collet 222 is nested in the housing 208, at least one collet seal 222d may engage the walls of the recess 208c. Then, at step 600, the hydraulic cylinders 206 of the hydraulic displacement mechanism 200 are actuated. Hydraulic fluid is injected through the fluid port 220 into the cylindrical chamber of the tubular body 216, which forces the piston assembly to slidably move in a linear direction along the z-axis towards the front end 216b of the tubular body 216. Movement of the piston assembly causes the cylinder rod 218 to move in the z-direction such that the cylinder rod 218 extends from the front end 216b of tubular body 216. Movement by the cylinder rod translates into movement of the housing 208 along the z-axis in the z-direction, which causes the walls of the housing recess 208c to engage the surface of the collet arms 222c causing the collet arms 222c to pinch inward and firmly secure the cable within the collet 222c. Additional hydraulic fluid causes the cylinder rod 218, housing 208, and clamping mechanism 210 fixed to the cable to move linearly along the z-axis in the z-direction which translates to movement of the cable linearly along the z-axis. In this manner, at step 700, the hydraulic displacement mechanism 200 dislodges the cable in the direction of force, here the z-direction, by directly applying pulling pressure to the cable along the z-axis. Lastly, at step 800, the hydraulic displacement mechanism 200 can be manually or mechanically retracted, and the clamping mechanism 210 disengages with the cable.

The hydraulic displacement mechanism 100, 200 can assume a variety of shapes and sizes which permit the hydraulic displacement mechanism 100, 200 to attach to a lodged cable and dislodge the cable by directly applying hydraulic pressure to the cable. By adding more hydraulic cylinders 106, 206 to the hydraulic displacement mechanism 100, 200, the pulling force of the hydraulic displacement mechanism 100, 200 is increased when the plurality of hydraulic cylinders 106, 206 are synchronously actuated.

Certain embodiments of the devices and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the devices and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method of utilizing a hydraulic displacement mechanism to dislodge a stuck cable, the method comprising:
   inserting the stuck cable through the hydraulic displacement mechanism;
   attaching a clamping mechanism to the stuck cable, wherein the clamping mechanism is located proximate to the hydraulic displacement mechanism; and
   actuating the hydraulic displacement mechanism by injecting hydraulic fluid into the hydraulic displacement mechanism to apply force to a piston and cause the piston to move a rod along an axis such that the hydraulic displacement mechanism engages the clamping mechanism to free the stuck cable.

2. The method of claim 1, wherein the hydraulic displacement mechanism dislodges the cable by directly applying pulling force to the cable.

3. The method of claim 1, wherein the clamping mechanism is detached after the cable is dislodged.

4. The method of claim 1, further comprising retracting the hydraulic displacement mechanism to disengage the stuck cable from the clamping mechanism.

5. The method of claim 1, wherein the rod extends from a front end of a hydraulic cylinder.

6. The method of claim 1, wherein the piston is prevented from further movement by a stop disposed within a cylindrical chamber housing the piston.

7. The method of claim 6, wherein the stop projects into the cylindrical chamber.

8. The method of claim 1, further comprising retracting the rod manually.

9. The method of claim 1, further comprising retracting the rod mechanically.

10. The method of claim 1, wherein the clamping mechanism is a removable component.

11. The method of claim 1, wherein the clamping mechanism has a clamping mechanism channel extending therethrough.

12. The method of claim 11, wherein the clamping mechanism is configured to accept the stuck cable.

13. The method of claim 1, wherein the hydraulic displacement mechanism comprises a hydraulic cylinder.

14. The method of claim 1, wherein the hydraulic displacement mechanism comprises three hydraulic cylinders.

15. The method of claim 1, wherein the hydraulic fluid is injected into the hydraulic displacement mechanism by a fluid port.

16. The method of claim 15, wherein the displacement mechanism further comprises a second port to vent hydraulic fluid.

17. The method of claim 14, wherein the three hydraulic cylinders are operated synchronously.

18. The method of claim 1, wherein the clamping mechanism is a collet.

19. A method of utilizing a hydraulic displacement mechanism to dislodge a stuck cable, the method comprising:
    inserting a stuck cable through a cylindrical passage in a hydraulic cylinder with the hydraulic cylinder in a retracted position;
    attaching a clamping mechanism to the stuck cable at a position proximate to a front end of a tubular body and a second end of a rod;
    injecting hydraulic fluid through a fluid port into a cylindrical chamber of the tubular body thereby forcing a piston to slidably move in a linear direction along an axis towards the front end of the tubular body, causing the rod to move in a direction such that the rod extends from the front end of the tubular body and engages the clamping mechanism; and
    applying a pulling pressure to dislodge the stuck cable.

20. A method of utilizing a hydraulic displacement mechanism to dislodge a stuck cable, the method comprising:
    extending a stuck cable through a base opening, a cap opening, and a housing channel while a hydraulic displacement mechanism is in a retracted position;
    receiving the stuck cable by a clamping mechanism in a bore of a collet wherein the collet is positioned within a housing; and
    actuating a hydraulic displacement mechanism by injecting hydraulic fluid through a fluid port into a cylindrical chamber of a tubular body, forcing each piston of a piston assembly to slidably move in a linear direction along an axis towards a front end of a tubular body, causing a rod to move in a direction such that the rod extends from the front end of the tubular body so as to dislodge the stuck cable in the direction.

* * * * *